(12) United States Patent
Buettiker

(10) Patent No.: US 8,657,182 B2
(45) Date of Patent: Feb. 25, 2014

(54) TORSION SONOTRODE, ULTRASONIC WELDING DEVICE AND METHOD FOR PRODUCING A WELDED CONNECTION BY MEANS OF ULTRASONIC SOUND

(75) Inventor: Albert Buettiker, Kirchberg (CH)

(73) Assignee: Telsonic Holding AG, Bronschhofen (CH)

( * ) Notice: Subject to any disclaimer, the term of this patent is extended or adjusted under 35 U.S.C. 154(b) by 0 days.

(21) Appl. No.: 13/643,001

(22) PCT Filed: May 5, 2011

(86) PCT No.: PCT/EP2011/057219
§ 371 (c)(1),
(2), (4) Date: Nov. 27, 2012

(87) PCT Pub. No.: WO2011/138404
PCT Pub. Date: Nov. 10, 2011

(65) Prior Publication Data
US 2013/0075454 A1    Mar. 28, 2013

(30) Foreign Application Priority Data

May 7, 2010   (DE) .......................... 10 2010 028 765
May 27, 2010  (DE) .......................... 10 2010 029 395

(51) Int. Cl.
*B23K 1/06*   (2006.01)
(52) U.S. Cl.
USPC ...................... 228/110.1; 228/1.1; 156/580.1
(58) Field of Classification Search
None
See application file for complete search history.

(56) References Cited

U.S. PATENT DOCUMENTS

| | | | |
|---|---|---|---|
| 3,039,333 A | | 6/1962 | Jones et al. |
| 5,087,320 A | * | 2/1992 | Neuwirth ................... 156/580.2 |
| 5,096,532 A | * | 3/1992 | Neuwirth et al. .......... 156/580.1 |
| 5,110,403 A | * | 5/1992 | Ehlert ......................... 156/580.1 |
| 5,603,444 A | | 2/1997 | Sato |
| 5,645,681 A | * | 7/1997 | Gopalakrishna et al. .. 156/580.2 |
| 5,662,766 A | * | 9/1997 | Ishikawa et al. ........... 156/580.2 |
| 5,947,364 A | * | 9/1999 | Tamura et al. ................. 228/1.1 |
| 5,976,316 A | * | 11/1999 | Mlinar et al. ............... 156/580.2 |
| 6,299,051 B1 * | | 10/2001 | Tsujino ....................... 228/110.1 |
| 6,491,785 B1 * | | 12/2002 | Sato et al. ................... 156/379.6 |
| 2003/0155403 A1 * | | 8/2003 | Haregoppa et al. ........ 228/110.1 |
| 2004/0011452 A1 * | | 1/2004 | Capodieci ..................... 156/73.3 |
| 2004/0118524 A1 * | | 6/2004 | Stegelmann ................ 156/580.2 |
| 2005/0199676 A1 * | | 9/2005 | Stroh et al. ..................... 228/1.1 |
| 2006/0043150 A1 * | | 3/2006 | Noro .............................. 228/1.1 |
| 2006/0071054 A1 * | | 4/2006 | Bolser et al. ................ 228/124.6 |

(Continued)

FOREIGN PATENT DOCUMENTS

| | | |
|---|---|---|
| DE | 44 06 818 C1 | 10/1995 |
| DE | 102008002744 A1 * | 12/2009 |
| EP | 1 566 233 A1 | 8/2005 |
| EP | 1 930 148 A1 | 6/2008 |

OTHER PUBLICATIONS

PCT, "International Search Report for PCT/JP2011/057219" Jul. 25, 2011.

*Primary Examiner* — Kiley Stoner
(74) *Attorney, Agent, or Firm* — Manabu Kanesaka

(57) ABSTRACT

The invention relates to a torsion sonotrode, comprising two mutually opposing end faces (S1, S2) and a circumferential surface (U) which surrounds a torsion axis (T) and on which at least one working surface (A1, A2, A3, A4) is provided at a radial distance from the torsion axis (T).

15 Claims, 4 Drawing Sheets

(56) References Cited

U.S. PATENT DOCUMENTS

| | | |
|---|---|---|
| 2007/0125829 A1* | 6/2007 | Stegelmann .................. 228/1.1 |
| 2010/0040903 A1 | 2/2010 | Kalt et al. |
| 2010/0282395 A1* | 11/2010 | Volger et al. ................. 156/73.1 |
| 2010/0320257 A1* | 12/2010 | Buttiker ..................... 228/110.1 |
| 2011/0036897 A1* | 2/2011 | Nakai ........................... 228/1.1 |
| 2011/0042014 A1* | 2/2011 | Vogler ....................... 156/580.1 |
| 2011/0143161 A1* | 6/2011 | Schroth et al. ................ 428/594 |
| 2011/0220292 A1* | 9/2011 | Short ........................ 156/580.1 |
| 2012/0012258 A1* | 1/2012 | Vogler .......................... 156/510 |

* cited by examiner

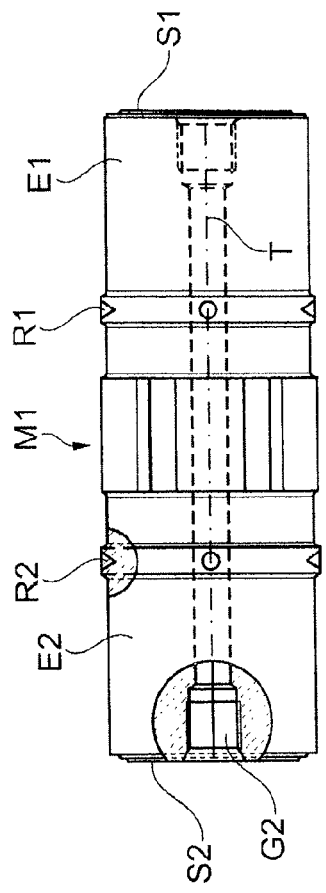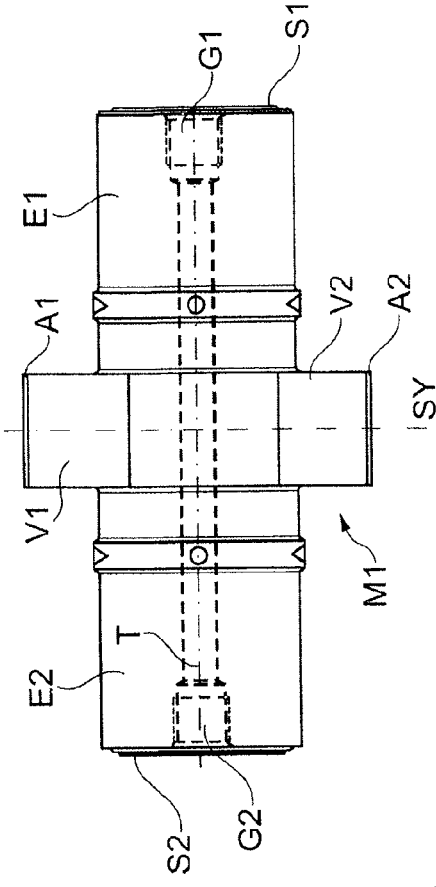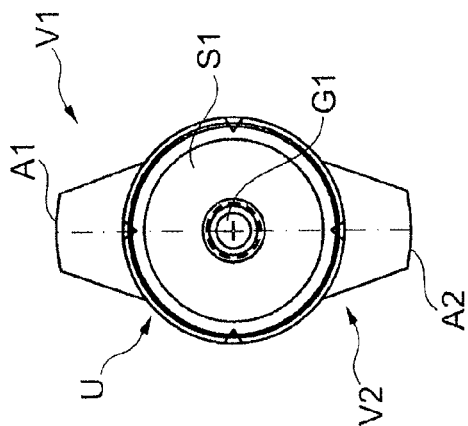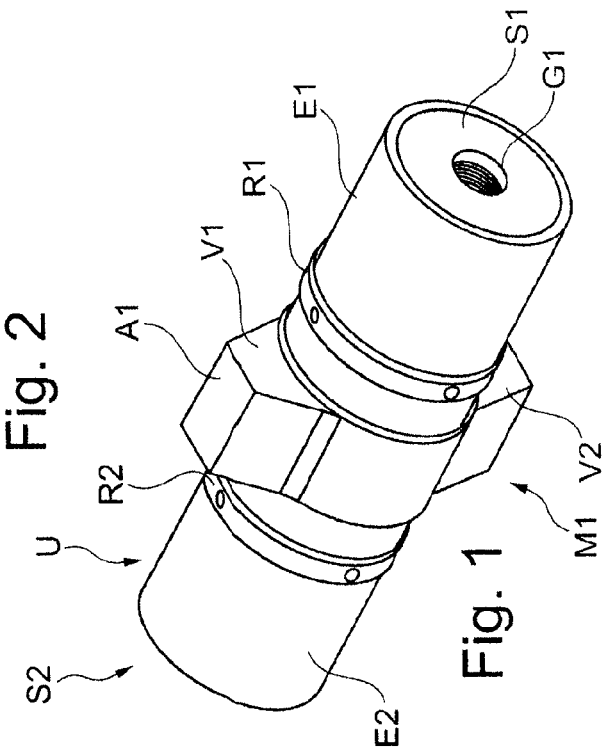

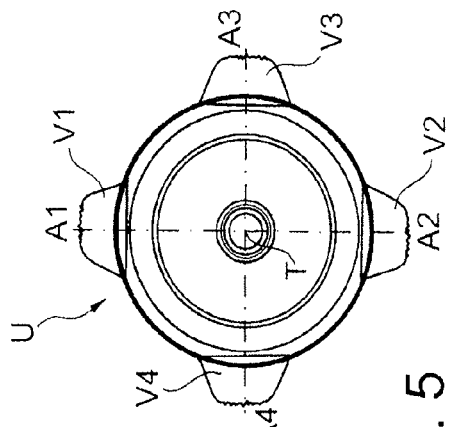
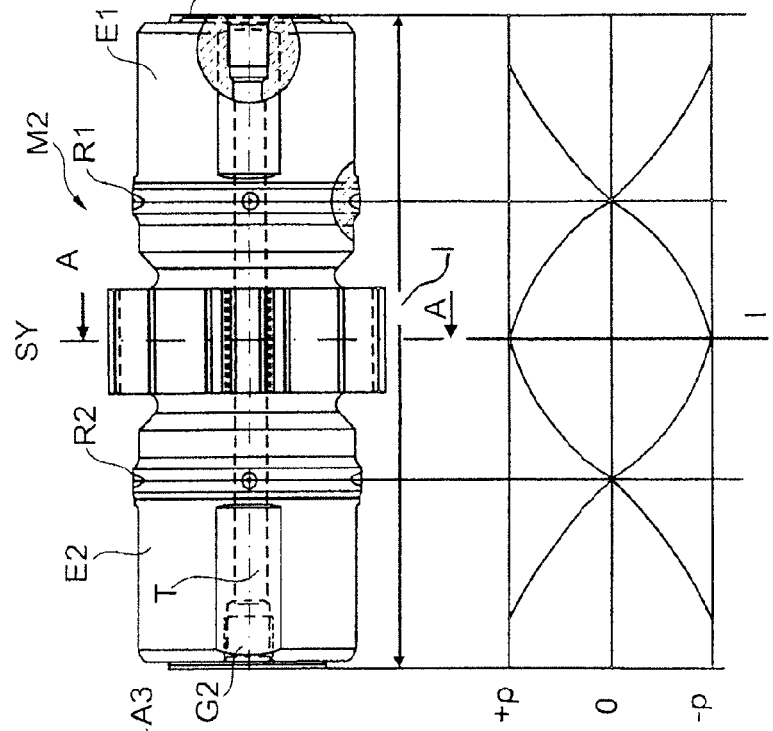
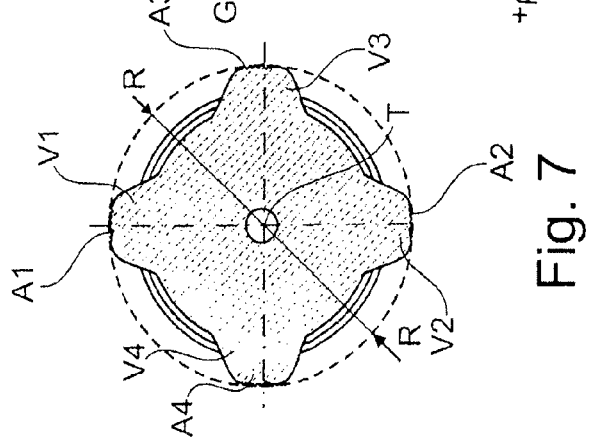

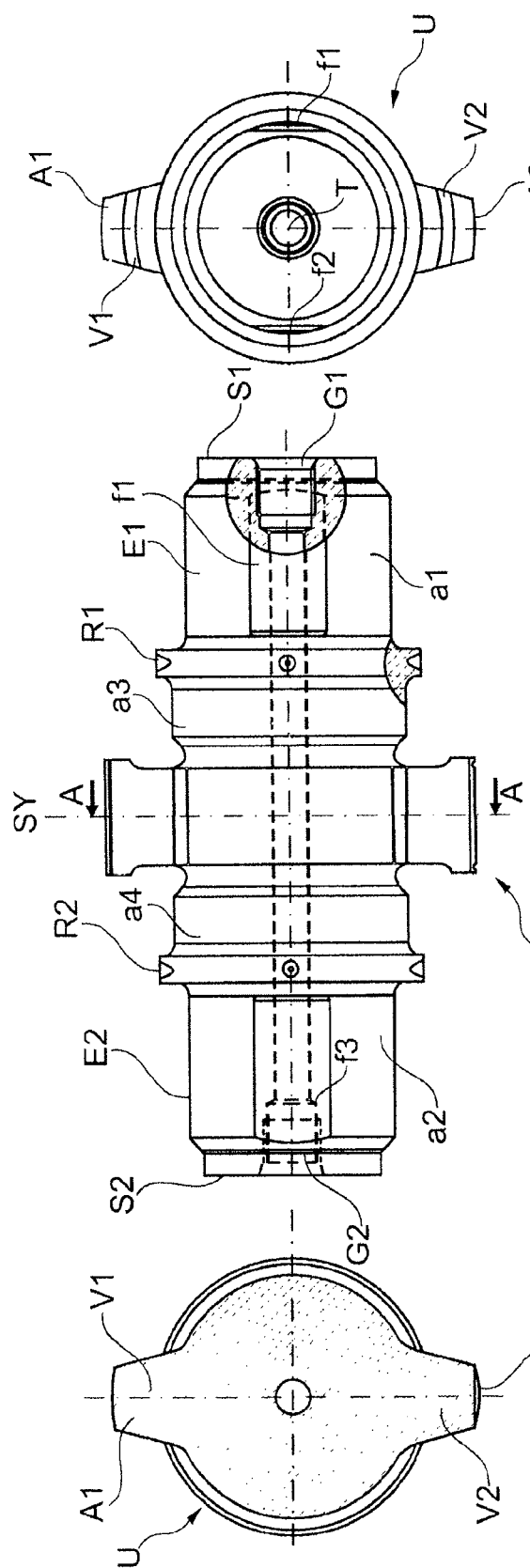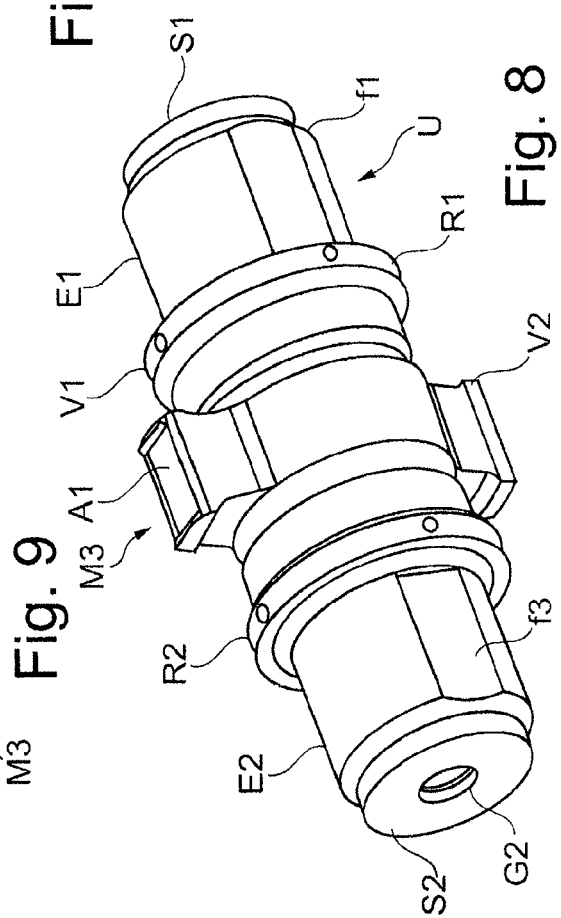

TORSION SONOTRODE, ULTRASONIC WELDING DEVICE AND METHOD FOR PRODUCING A WELDED CONNECTION BY MEANS OF ULTRASONIC SOUND

RELATED APPLICATIONS

The present application is National Phase of International Application No. PCT/EP2011/057219 filed May 5, 2011, and claim priorities from German Applications No. 10 2010 028 765.2, filed May 7, 2010 and No. 10 2010 029 395.4, filed May 27, 2010.

The invention relates to a torsion sonotrode, an ultrasonic welding device and a method for producing a welded connection by means of ultrasonic sound.

The invention generally concerns the field of ultrasonic welding. In particular, it concerns the field of ultrasonic welding of metal components. The components are moved relative to one another substantially parallel to a welding surface by the action of an ultrasonic vibration, wherein, perpendicular thereto, a pressure or a welding force is simultaneously exerted onto the components to be connected. The ultrasonic vibration makes it possible to tear open and displace the contamination and oxide layers usually present on component surfaces. The resultant direct contact of the pure metal surfaces leads to a permanent integral connection between the metal components.

An ultrasonic welding device is known from U.S. Pat. No. 3,039,333, in which a rod-shaped sonotrode is coupled by means of couplers extending radially therefrom to two converters. A working surface of the sonotrode pressed against the components to be connected is moved back and forth substantially parallel to the welding surface along a straight path.

U.S. Pat. No. 5,603,444 discloses an ultrasonic welding device having a longitudinal sonotrode, of which the working surface is likewise moved back and forth along a straight path. The longitudinal sonotrode is connected to a converter in a conventional manner via screw connections and with interpositioning of a booster. A pressure device is further provided to generate a pressure on the working surface. The pressure generated by the pressure device is applied via the nodal lines of the longitudinal sonotrode. In practice it has been found that only a fraction of the ultrasonic power provided by the converter is transferred to the working surface. According to more recent findings, this is to be attributed to the occurrence of tilting movements of the adjacent joining surfaces between the longitudinal sonotrode and the booster as well as between the booster and the converter, caused by the pressure exerted on the working surface. This effect increases with increasing pressure.

EP 1 930 148 A1 discloses an ultrasonic welding device with use of what is known as a torsion sonotrode. In this case, the sonotrode is a substantially rotationally symmetrical sonotrode, of which the working surface is provided at one end face of said sonotrode. Converters, with which a vibration directed about a torsion axis is transferred to the torsion sonotrode, are coupled to a circumferential surface of the torsion sonotrode in the vicinity of the other end face. Consequently, the working surface pressed against the components to be connected moves back and forth over a curved line corresponding to the circumference of the torsion sonotrode. A disadvantage in this instance is that a power transferred to the components to be connected is smaller in a radially inner portion of the working surface than in a radially outer portion of the working surface. Consequently, the welded connection between the components to be connected is not uniform.

The object of the invention is to overcome the disadvantages of the prior art. In particular, a sonotrode is disclosed, with which the power provided by the converter can be transferred to the working surface with improved efficiency. The improved efficiency of the power transfer is also to be achieved in particular when a high pressure is exerted. In accordance with a further objective of the invention, an ultrasonic welding device and a method for producing a welded connection by means of ultrasonic sound, which enable efficient and uniform production of a welded connection between components to be connected, are also disclosed.

In accordance with one aspect of the invention, a torsion sonotrode is proposed, comprising two mutually opposed end faces and a circumferential surface, which surrounds a torsion axis and on which at least one working surface is provided at a radial distance from the torsion axis.

With the torsion sonotrode according to the invention, the working surface is no longer located at one of the end faces, in contrast to the prior art, but on the circumferential surface surrounding the torsion axis. Consequently, all surface elements of the working surface have substantially the same radial distance from the torsion axis. A uniform power can be transferred over a substantial portion of the working surface to the components to be welded. A welded connection produced using the sonotrode according to the invention is uniform.

Furthermore, the proposed torsion sonotrode enables a substantially loss-free transfer of the power provided by the converter to the working surface. During the process, no tilting movements are produced at the joining surfaces between the torsion sonotrode, an optionally provided booster and the converter. The working surface performs a torsional movement about the torsion axis, but not a longitudinal movement parallel to the torsion axis. The proposed torsion sonotrode is suitable in particular for the production of a welded connection between metal components, for example between a stranded wire and a plug.

With suitable excitation of the proposed torsion sonotrode using ultrasound, there are only small or insignificant strains in the axial direction, but twisting in the transverse direction, which is to be described by the modulus of torsion G. The following is true for the frequency of the torsional vibration:

$$v_n = \frac{n}{2l}\sqrt{\frac{G}{\rho}}$$

wherein n is an integer >0,
l is the axial length of the torsion electrode, and
ρ is the density of the torsion sonotrode.

An axial length l of the torsion sonotrode is expediently selected such that said sonotrode performs a stationary vibration or natural vibration with the wavelength λ at a predefined frequency $v_n$. In this case, the working surface is provided centrally on the circumferential surface. In principle however, it is possible to select an axial length l of the torsion sonotrode with respect to a predefined frequency $v_n$ such that natural vibrations of wavelength nλ/2 can thus be generated, wherein n is an integer >0. That is to say, a length l of the torsion sonotrode may also be λ/2, 3λ/2, 2λ, etc.

In accordance with an advantageous embodiment, the torsion sonotrode has a preferably radially protruding annular surface on the circumferential surface on either side of the at least one working surface, said annular surface lying over a nodal line with respect to a wavelength of a natural vibration of the torsion sonotrode. An axial length l of the torsion sonotrode is expediently selected such that it corresponds precisely to the wavelength λ of the natural vibration at a predefined ultrasonic frequency. In this case, the nodal lines are located for example at ¼ and ¾ of the length l of the torsion sonotrode. In this case, the working surface can be arranged between the nodal lines and, for example, is located at ½ the length l of the torsion sonotrode.

The torsion sonotrode is advantageously symmetrical about a plane of symmetry running perpendicular through the torsion axis. In accordance with a particularly advantageous embodiment, a contour or an outline of the working surface is symmetrical about the plane of symmetry. In particular, it may therefore be that the plane of symmetry runs through the at least one working surface and the working surface is symmetrical about the plane of symmetry. Such an embodiment of the torsion sonotrode is particularly simple. In this case, the at least one working surface is arranged centrally with respect to the axial length l of the torsion sonotrode on the circumferential surface thereof.

In accordance with a further advantageous embodiment, the torsion sonotrode has a central part comprising the at least one working surface, said central part being connected releasably to end pieces extending from either side thereof and each having one of the end faces. In this case, each of the end pieces may have an annular surface. A connection between the end pieces and the central part may be a screw connection for example. It may also be that the two end pieces are directly interconnected, for example by means of a screw connection, and the central part is formed as a ring, which is shrink-fitted onto the connected end pieces. The provision of a central part comprising the working surfaces makes it possible to change a working surface geometry by replacing the central part. In case of damage to a working surface, a repair of the torsion sonotrode can likewise be carried out easily by replacement of the central part.

In accordance with a further advantageous embodiment, the working surface is curved in the circumferential direction with a predefined radius. The radius expediently originates in the torsion axis, that is to say the working surface thus lies on a circumference about the torsion axis in this instance.

In accordance with a further advantageous embodiment, the working surface is a radially protruding, circumferential annular working surface. Such an annular working surface enables particularly long service lives of the torsion sonotrode. If a portion of the annular working surface becomes used, a further, as yet unused, portion of the annular working surface can be provided by turning the torsion sonotrode through a predefined angle to produce further welded connections. The number of welded connections producible with the proposed torsion sonotrode can thus be multiplied compared to conventional sonotrodes.

In accordance with a further advantageous embodiment, it may also be that n working surfaces are provided, which are arranged uniformly over the circumference at an angle of 360°/n, wherein n is an integer >1. In this case, the working surfaces are anvil-shaped for example and protrude radially from a circumferential surface of the torsion sonotrode. For example, 2, 3, 4, 5, 6, 7, 8 or more working surfaces of this type may be provided. The provision of a multiplicity of working surfaces enables a quick change in the event that one working surface becomes worn, similarly to the provision of an annular working surface. Such a torsion sonotrode has a particularly long service life. One working surface can be changed for another working surface by simply rotating the torsion sonotrode. Replacement or disassembly is not necessary for this purpose.

In accordance with a further advantageous embodiment, the working surface has a structure, preferably ribs. The ribs may run axially, or inclined with respect to the axial direction. In accordance with an advantageous embodiment, it is also possible to coat the working surface with polycrystalline diamond (PCD). Such a PCD layer can be soldered onto the working surface for example. The durability of the working surface can thus be increased and/or an undesirable connection during welding, in particular with aluminium, can be avoided.

In accordance with a further aspect of the invention, an ultrasonic welding device is proposed, in which at least one converter is coupled to a torsion sonotrode according to the invention to generate an ultrasonic vibration directed about the torsion axis. With the proposed ultrasonic welding device, a high power can be transferred to the components to be connected. Relatively thick metal components can thus be welded with outstanding quality.

In accordance with an advantageous embodiment, the converter is connected radially to a torsional vibration element, which is coupled to one of the end faces of the torsion sonotrode. The torsional vibration element is a cylindrical rod for example. Of course, it is also possible to connect a plurality of converters radially to the torsional vibration element to generate the torsional vibration. Torsional vibration means of this type are known per se from the prior art. Reference is made to EP 1 930 148 A1, which discloses suitable torsional vibration means in [0039] and [0040] and in FIGS. 2 and 3. The disclosure of the document is incorporated herein in this regard.

In accordance with a further advantageous embodiment, the torsional vibration element is connected to the end face of the torsion sonotrode with interpositioning of a booster. The booster has the function of modifying the amplitude provided by the converter and forwarding it into the torsion sonotrode according to the invention. Depending on the design of the booster, the amplitude can be reduced or increased. Generally, boosters which increase the amplitude provided by the converter are used. The conversions of a booster may be 1:1.5 to 1:2 for example.

In accordance with a further embodiment, a further converter can be coupled to the other of the end faces of the torsion sonotrode to generate an ultrasonic vibration directed about the torsion axis. The further converter can be connected radially to a further torsional vibration element, which is coupled to the other end face of the torsion sonotrode. A corresponding further torsional vibration device can be designed identically to the above-mentioned torsional vibration device. In particular, it may also be that the further torsional vibration element is connected to the other end face of the torsion sonotrode with interpositioning of a further booster. With the above-mentioned embodiment, it is possible to couple particularly high powers into the torsion sonotrode. A phase of the vibrations of the converter and of the further converter and, where applicable, the conversion ratios of the boosters are, in this case, matched to one another such that the respective powers coupled in complement one another.

In accordance with a further embodiment, a pressure device is provided to generate a pressure on the working surface acting substantially perpendicular to the torsion axis. For example, the pressure device may be a hydraulically, pneumatically or electrically operated pressure device in this instance. The pressure on the working surface can be generated by pressing the torsion sonotrode, via the working surface provided thereon, against a fixed anvil or the components to be connected arranged thereon. However, it may also be that the torsion sonotrode is fixed and that the anvil is pressed against the working surface.

In any case, it is expedient for the torsion sonotrode to be supported by a supporting device via the annular surfaces provided thereon. Since the annular surfaces lie over the nodal lines of the torsion sonotrode, no power is lost by the proposed support.

The supporting device can be connected to the pressure device. In this case, the torsion sonotrode can be moved against a fixed anvil by the pressure device.

In accordance with a further aspect of the invention, a method for producing a welded connection by means of ultrasound is proposed and comprises the following steps:

providing a torsion sonotrode according to the invention, arranging two components to be welded together between the working surface and a substrate, exerting a pressure acting substantially perpendicular to the torsion axis, so that the components to be welded together are clamped between the working surface and the substrate, and generating an ultrasonic vibration about the torsion axis, so that the working surface vibrates about the torsion axis over a curved path and a welded connection is produced by the frictional force thus exerted onto the components to be welded.

In accordance with an essential feature of the method according to the invention, the working surface delineates a pendulous movement about the torsion axis with respect to the substrate. A plane of vibration disposed perpendicular to the torsion axis remains substantially unchanged during this process, that is to say the working surface does not move in a direction parallel to the torsion axis or only moves in this direction to an insignificant extent. By means of the proposed method, a particularly high power can be transferred to the components to be connected. The amplitude of the vibration is identical at all points of the working surface. It is thus possible to produce a particularly homogeneous welded connection.

The substrate may be a fixed anvil. However, it is also possible for the substrate to be formed in the manner of a further torsion sonotrode according to the invention. In this case, the torsion sonotrode and the further torsion sonotrode advantageously vibrate in opposite directions. A distance between the working surface of the torsion sonotrode and a further working surface of the further torsion sonotrode can thus be kept substantially constant. With this embodiment, a much greater power can be transferred to the components to be welded. In this embodiment, the components to be welded can be held by a holding device that is fixed with respect to the torsion sonotrode and the further torsion sonotrode, said holding device preventing any swerving of the components to be welded together.

An exemplary embodiment of the invention will be explained in greater detail hereinafter on the basis of the drawings, in which:

FIG. 1 shows a perspective view of a first torsion sonotrode,

FIG. 2 shows a plan view according to FIG. 1,

FIG. 3 shows a first side view according to FIG. 1 and

FIG. 4 shows a second side view according to FIG. 1,

FIG. 5 shows a side view of a second torsion sonotrode,

Figure 12:
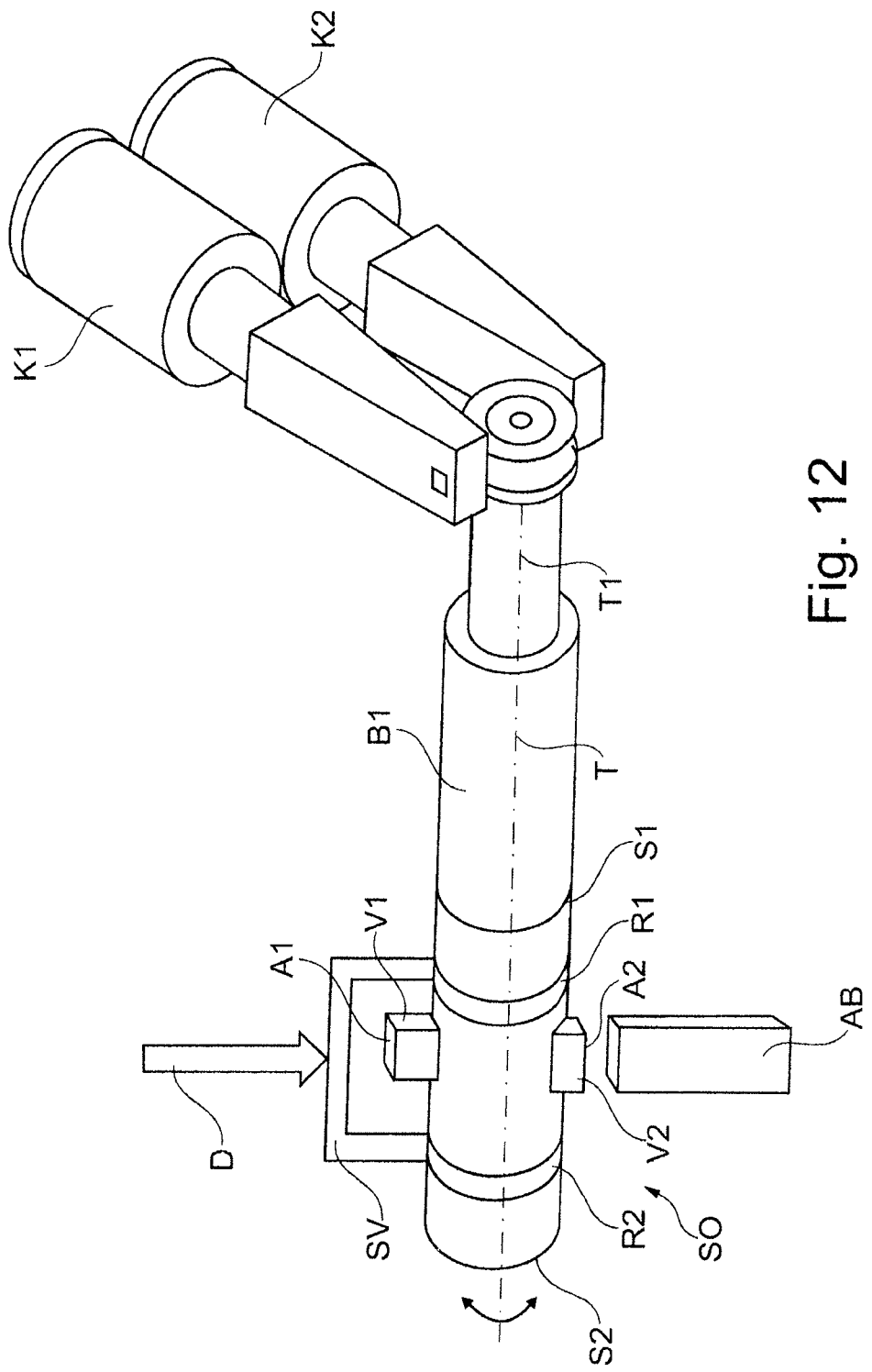

FIG. 5a shows a natural vibration of wavelength λ in the case of the second torsion sonotrode, FIG. 6 shows a plan view according to FIG. 5, FIG. 7 shows a sectional view in accordance with the line of section A-A in FIG. 5, FIG. 8 shows a perspective view of a third torsion sonotrode, FIG. 9 shows a side view according to FIG. 8, FIG. 10 shows a plan view according to FIG. 8, FIG. 11 shows a sectional view in accordance with the line of section A-A in FIG. 9, and FIG. 12 shows a schematic view of an ultrasonic welding device.

The first torsion sonotrode shown in FIGS. 1 to 4 has two mutually opposed round end faces S1, S2, through the midpoint of which a first threaded bore G1 and a second threaded bore G2 extends centrally. A circumferential surface U connecting the end faces S1 and S2 is cylindrical in this instance. The circumferential surface U is a surface which is virtual, at least in some portions, and of which the cross-sectional geometry corresponds substantially to the geometry of the end faces. The first torsion sonotrode has two substantially cylindrical end portions E1, E2. A first end portion E1 is defined by the first end face S1, and a second end portion E2 is defined by the second end face S2. A central part M having two mutually opposed anvil-like protrusions V1, V2 protruding from the circumferential surface U is located between the end portions E1, E2. A first protrusion V1 has a first working surface A1, and a second protrusion V2 has a second working surface A2. A radial distance of the working surfaces A1, A2 from a torsion axis denoted by reference sign T is advantageously greater than a radius of the circumferential surface U. For example, it is 50 to 100 mm, preferably 60 to 90 mm. A radius of the circumferential surface may be 30 to 70 mm, preferably 40 to 60 mm.

Annular surfaces R1, R2 protruding radially from the circumferential surface U are provided on the end pieces E1, E2 on either side of the central part M.

The first torsion sonotrode is symmetrical about the plane of symmetry SY shown in FIG. 4. The plane of symmetry SY is disposed perpendicular to a torsion axis denoted by reference sign T. In this instance, the end pieces E1, E2 are substantially rotationally symmetrical about the torsion axis T.

The second torsion sonotrode shown in FIGS. 5 to 7 has a second central part M2 between the end pieces E1, E2, which has four anvil-like protrusions V1, V2, V3, V4 over the circumference. The protrusions V1, V2, V3, V4 are each offset from one another by an angle of 90°. They are symmetrical about the plane of symmetry SY. The working surfaces A1, A2, A3, A4 provided on the circumferential surfaces of each of the protrusions V1, V2, V3, V4 are curved in the circumferential direction. The radius of curvature thereof extends from the torsion axis T and is denoted by reference sign R in FIG. 7. As can further be seen from FIG. 7 in particular, each of the working surfaces A1, A2, A3, A4 has a structure that may be formed, for example, by axially extending ribs.

As can be seen in particular in conjunction with FIG. 5, an axial length l of the torsion sonotrode is selected such that the stationary vibrations shown in FIG. 5a with the wavelength λ are provided at a predefined ultrasonic frequency. FIG. 5a shows the amplitude +/−ρ of both opposed vibration states over the length l of the torsion sonotrode. The zero crossings of the stationary vibration form nodal lines, over which the annular surfaces R1, R2 are located. The torsion sonotrode vibrates in such a way that the end pieces E1, E2 each move in the opposite direction to the central part M2.

In contrast to the embodiment shown in FIGS. 5 to 7, it may also be that a single (not shown here) annular protrusion is provided instead of the protrusions V1, V2, V3, V4, a circumferential working surface (not shown here) being formed on said single annular protrusion. Furthermore, it is also conceivable that six or eight protrusions may be provided instead of the four protrusions V1, V2, V3, V4.

FIGS. 8 to 11 show a third torsion sonotrode. With the third sonotrode, the end pieces E1, E2 have a smaller diameter in a portion a1, a2 arranged outwardly from the annular surfaces R1, R2 compared to an inner portion a3, a4 located in the vicinity of a third central part M3. Due to the different design of the diameters of the end pieces E1, E2 with respect to the annular surfaces R1, R2, said end pieces have the effect of a booster. Mutually opposed surfaces f1, f2, f3 and (not shown here) f4 aligned parallel to one another are further provided on the outer portions a1, a2. The surfaces f1 to f4 are used to engage a tool.

The torsion sonotrodes shown in the exemplary embodiments are advantageously produced from a piece made of metal. Although not shown in the above figures, it may also be, however, that the central part M1, M2 is connected in a releasable manner to the end pieces E1, E2, for example by means of a screw connection. The end faces S1, S2 may further be provided with radially extending structures, for example grooves, webs, recesses, pins or the like, which enables a play-free connection to a booster or a torsion rod.

FIG. 12 shows a schematic perspective view of the construction of an ultrasonic welding device with use of a torsion sonotrode according to the invention, which is denoted in general in FIG. 12 by reference sign SO. The torsion sonotrode SO is connected rigidly at its first end face S1 to a first booster B1 by means of a screw connection. The first booster B1 is in turn screwed by means of a screw connection to a first torsion rod T1, to which a first converter K1 and a second converter K2 are attached in a radially opposed arrangement. Reference sign AB denotes an anvil, which is arranged in a fixed manner with respect to the torsion sonotrode SO. A supporting device SV indicated schematically in this instance engages around the annular surfaces R1, R2, for example in a clamping manner. The supporting device SV is connected to a pressure device D, with which the ultrasonic vibration device formed from the converters K1, K2, torsion rod T1, booster B1 and torsion sonotrode SO is movable vertically with respect to the anvil AB, and with which a pressure can be exerted onto the second working surface A2 or onto components to be connected (not shown here), which are placed between the second working surface A2 and the anvil AB.

The ultrasonic welding device functions as follows:

A torsional vibration directed about the torsion axis T is generated in the first torsion rod T1 by the converters K1, K2, which are operated in opposite phases, and said torsional vibration is transferred via the first booster B1 to the torsion sonotrode SO. Consequently, the protrusions V1, V2 and the working surfaces A1, A2 provided thereon vibrate over a circular path portion about the torsion axis T. A position of the protrusions V1, V2 in the axial direction remains substantially unchanged during this process. To produce a welded connection, two components to be connected (not shown here) are placed on the anvil AB. The second working surface A2 of the torsion sonotrode SO is then pressed onto the components, arranged one above the other, by means of the pressure device D. By starting up the converters K1, K2, a torsional vibration is generated, with which the components are displaced relative to one another. A welded connection is produced by the generated friction.

Although not shown in FIG. 12, the second end face S2 of the torsion sonotrode SO may, of course, also be connected to third and fourth converters K3, K4 (not shown here) via a second booster B2 (not shown here) and a second torsion rod T2 (not shown here).

The ultrasonic vibration device formed from converters, boosters and torsion sonotrode may also be arranged in a fixed manner. In this case, the anvil AB may be vertically movable and may be provided with a pressure device. Furthermore, it is also conceivable for two ultrasonic welding devices to be operated in a mutually opposed arrangement to produce a welded connection. In this case, a further torsion sonotrode is thus provided instead of the anvil AB. In this instance, the mutually opposed torsion sonotrodes vibrate in opposite directions.

| List of reference signs | |
|---|---|
| a1, a2 | outer portion |
| a3, a4 | inner portion |
| A1, A2, A3, A4 | working surface |
| AB | anvil |
| B1 | first booster |
| D | pressure device |
| E1 | first end piece |
| E2 | second end piece |
| G1, G2 | thread |
| f1, f2, f3, f4 | surfaces |
| K1 | first converter |
| K2 | second converter |
| l | axial length of the torsion sonotrode |
| M1 | first central part |
| M2 | second central part |
| M3 | third central part |
| R | radius of curvature |
| R1 | first annular surface |
| R2 | second annular surface |
| S1 | first end face |
| S2 | second end face |
| SO | torsion sonotrode |
| SV | supporting device |
| SY | plane of symmetry |
| T | torsion axis |
| T1 | first torsion rod |
| U | circumferential surface |
| V1, V2, V3, V4 | protrusion |

The invention claimed is:

1. An ultrasonic welding device, comprising:
a torsion sonotrode comprising two opposed end faces, a circumferential surface which surrounds a torsion axis and connects the opposed end faces, and working surfaces provided at a radial distance from the torsion axis,
wherein annular surfaces are provided on the circumferential surface on two sides of the working surfaces and lie over a nodal line with respect to a wavelength of a natural vibration of the torsion sonotrode,
wherein the torsion sonotrode is symmetrical about a plane of symmetry running perpendicular through the torsion axis,
wherein at least one converter is coupled to one of the end faces of the torsion sonotrode to generate an ultrasonic vibration directed about the torsion axis, and
wherein a pressure device is provided to generate a pressure on both of the annular surfaces acting substantially perpendicular to the torsion axis.

2. The ultrasonic welding device according to claim 1, wherein the at least one converter is connected radially to a torsional vibration element, which is coupled to one of the end faces of the torsion sonotrode.

3. The ultrasonic welding device according to claim 2, wherein the torsional vibration element is connected to one of the end faces of the torsion sonotrode with interpositioning of a booster.

4. The ultrasonic welding device according to claim 2, wherein another converter is coupled to other end face of the one of the end faces of the torsion sonotrode to generate an ultrasonic vibration directed about the torsion axis.

5. The ultrasonic welding device according to claim 4, wherein the further another converter is connected radially to another torsional vibration element, which is coupled to the other end face of the torsion sonotrode.

6. The ultrasonic welding device according to claim 5, wherein the another torsional vibration element is connected to the other end face of the torsion sonotrode with interpositioning of a booster.

7. The ultrasonic welding device according to claim 1, wherein the torsion sonotrode is supported in a supporting device via the annular surfaces provided on said sonotrode.

8. The ultrasonic welding device according to claim 7, wherein the supporting device is connected to the pressure device.

9. A method for producing a welded connection between metal components by ultrasound, said method comprising the following steps:
providing a torsion sonotrode comprising two opposed end faces, a circumferential surface which surrounds a torsion axis and connects the opposed end face, and working surfaces provided at a radial distance from the torsion axis,
wherein annular surfaces are provided on the circumferential surface on two sides of the working surfaces and lie over a nodal line with respect to a wavelength of a natural vibration of the torsion sonotrode,
wherein the torsion sonotrode is symmetrical about a plane of symmetry running perpendicular through the torsion axis,
arranging two metal components to be welded together between the working surfaces and a substrate,
exerting a pressure upon both annular surfaces acting substantially perpendicular to the torsion axis, so that the metal components to be welded together are clamped between the working surfaces and the substrate, and
generating an ultrasonic vibration about the torsion axis, so that the working surfaces vibrate about the torsion axis over a curved path and a welded connection is produced by frictional force thus exerted onto the metal components to be welded.

10. The ultrasonic welding device according to claim 1, wherein a central part comprising the working surfaces is provided and is connected releasably to end pieces extending from either side thereof and each having one of the end faces.

11. The ultrasonic welding device according to claim 1, wherein the working surfaces are curved in a circumferential direction with a predefined radius.

12. The ultrasonic welding device according to claim 11, wherein each of the working surfaces is a radially protruding, circumferential annular working surface.

13. The ultrasonic welding device according to claim 1, wherein the annular surfaces protrude radially.

14. The ultrasonic welding device according to claim 1, wherein n working surfaces are provided, which are arranged uniformly over a circumference at an angle of 360°/n, wherein n is an integer >1.

15. The ultrasonic welding device according to claim 1, wherein each of the working surfaces has ribs, or is coated with polycrystalline diamond.

* * * * *